United States Patent
McKelvey (10) Patent No.: US 7,797,876 B2
(45) Date of Patent: Sep. 21, 2010

(54) ELASTIC FISHING DEVICE

(76) Inventor: Richard L. McKelvey, 9284 Beaver Shores Rd., Rogers, AR (US) 72756

( * ) Notice: Subject to any disclaimer, the term of this patent is extended or adjusted under 35 U.S.C. 154(b) by 649 days.

(21) Appl. No.: 11/724,872

(22) Filed: Mar. 19, 2007

(65) Prior Publication Data

US 2007/0214703 A1    Sep. 20, 2007

Related U.S. Application Data (60) Provisional application No. 60/783,501, filed on Mar. 20, 2006.

(51) Int. Cl.
*A01K 91/00* (2006.01)

(52) U.S. Cl. .............. 43/15; 43/43.11; 43/27.4; 43/42.72; 24/300

(58) Field of Classification Search .......... 43/4, 43/15, 27.4, 42.72, 43.11; 119/769, 795, 119/797; 24/300, 301, 129 B, 910
See application file for complete search history.

(56) References Cited

U.S. PATENT DOCUMENTS

| 1,153,058 | A | * | 9/1915 | Forster | 267/42 |
| 1,618,302 | A | | 2/1927 | Mathey | |
| 2,267,285 | A | | 12/1941 | McCrave | |
| 2,936,963 | A | * | 5/1960 | Witte | 242/405.1 |
| 3,133,683 | A | * | 5/1964 | Deacon, Sr, | 225/62 |
| 4,006,554 | A | * | 2/1977 | Tice et al. | 43/57.2 |
| 4,121,369 | A | | 10/1978 | Lopez | |
| 4,261,529 | A | * | 4/1981 | Sandberg et al. | 242/405.2 |
| 4,573,284 | A | * | 3/1986 | Hanson | 43/57.2 |
| 5,109,624 | A | * | 5/1992 | Bryan | 43/15 |
| 5,212,901 | A | | 5/1993 | Bishop et al. | |
| 5,279,066 | A | | 1/1994 | Camera | |
| 5,511,293 | A | * | 4/1996 | Hubbard et al. | 24/442 |
| D529,790 | S | * | 10/2006 | Peterson | D8/358 |

* cited by examiner

*Primary Examiner*—Son T Nguyen
*Assistant Examiner*—Marisa Conlon
(74) *Attorney, Agent, or Firm*—Boyd D. Cox (57) ABSTRACT

An elastic fishing device for securing a fishing line directly to a support on or near the water's edge has an elongated elastic member adjustably mounted on a spool which has a winding portion. The elongated elastic member is a shock cord that can be stored on the spool when the device is not in use. Additionally, the device can be adjusted to fit various sized supports and to fish at selected depths.

2 Claims, 9 Drawing Sheets

ELASTIC FISHING DEVICE

Priority for this application is claimed from U.S. Provisional Application No. 60/783,501 entitled "Elastic Fishing Device" filed on Mar. 20, 2006

I. BACKGROUND

The present invention is directed to an elastic fishing device for securing a fishing line directly to a support on or near the water's edge that can be readily set and easily stored when not in use. The elastic fishing device includes a shock cord comprised of an elastic material which decreases the chance of breaking the fishing line and enhances the probability of catching fish.

Typically fishermen use fishing rods or poles for supporting their fishing lines when fishing. Rods and poles can not only be expensive, they are also unwieldy and prone to breaking when transporting.

Bank lines are an alternative means for fishing that comprise set fishing implements that do not require the use of a rod and reel. A bank line typically comprises a length of rope or cable attached to a fishing leader line having a hook. The rope or cable is attached to a support adjacent to or near the water where the baited hook is dropped into the water. When fishing with bank lines, the fisherman is free to leave the line unattended, and return at a later time to retrieve any fish that may have been hooked in the interim. Since the bank line does not have to be directly attended, this type of fishing device allows a fisherman to set out a plurality of lines at one time.

When catching a fish, there is sometimes a great deal of activity by the fish as it strikes the bait and after taking the hook which can pull on the fishing line. When using a rod or pole, the bending of the rod or pole provides some give in order to deter the fishing line from breaking and losing the fish. In addition, a fisherman tending the rod can play the fish by letting the line out. Since a fishing rod is generally held by the user when fishing, he or she can manipulate the fishing line by moving the rod to set the hook in the fish and increase the chances of snaring the fish.

A drawback to fishing with a bank line is that not only does rope or cable used for bank line fishing lack the 'give' necessary to allow the action of the fish to pull without breaking the fishing line, it frequently lacks a constant attendant to let out the line when needed.

In some instances, a bank line can be attached to a limb or branch, whereby the flexibility of the limb can allow for movement of the fish and thereby deter breaking the fishing line. A flexible support limb can also help to set the hook in the fish's mouth and maintain the fish on the line after it's been hooked. Therefore, the flexibility imparted by the support limb or branch to the leader line can increase the chance of catching the fish.

However, such a method for fishing requires that there be limbs, branches or trees that are appropriately flexible and located conveniently on which to attach the bank line. Often, there are no flexible limbs or branches situated on the water's edge for supporting the bank line. In addition, the flexibility of a limb is an unknown factor and will vary from limb to limb, making it difficult to gauge its affect on the action of a fish.

The lack of trees can be more readily noted when fishing from a dock or pier. In such cases, a fisherman may be forced to attach his bank line to an inflexible support such as a rail, or post. Attachment to an inflexible support does not allow any extra give or pull to the fishing line. Consequently, when a fish is hooked and resists or fights, the fishing line is more readily subject to break.

A fish is known to 'spit out' the hook after taking the bait and as a result can escape from being caught. An experienced fisherman will often tug sharply on the line when he feels a fish nibbling the bait in order to set the hook in the fish's mouth. This tugging action is somewhat emulated by a limber branch supporting the bank line. The limb or branch flexes in response to a fish striking the bait and the hook is thereby pulled to snag in the fish's mouth. However, with the bank line attached to a rigid support, the hook on the leader line does not react with as much movement as a bank line mounted on a flexible support, and results in a reduced chance of hooking an interested fish.

There is a need for a fishing device for bank fishing that can readily stretch to deter breaking of the fishing line while increasing the probability of catching a fish. The elastic fishing device reduces the possibility of breaking the fishing line and increases the probability of hooking and holding the fish on the line until it is retrieved. The present invention is adapted to attach a fishing leader line to an inflexible support, while providing elasticity for the leader line to extend and retract in a way that can set the hook in a fish striking the bait. In addition, the elastic fishing device of the present invention can stretch and return to its unstretched length in order to ease the tension created on the fishing line when a fish is snared on the hook. Such stretching can reduce the probability of losing the fish by protecting the fishing line against breaking.

Additionally, there is the need for a fishing device that can be quickly set out and easily taken in for easy transport and storage.

II. SUMMARY

The present invention is drawn to an elastic fishing device for multiple uses such as bank fishing, drift fishing and ice fishing. The fishing device is stretchable and comprises an elongated elastic member with means for securing the fishing device to a support and means for attaching a fishing leader line to the fishing device. A spool provides convenient storage for the elastic member and fishing leader line when the device is not in use.

It is an object of the present invention to provide a fishing device that can increase the probability of hooking and catching a fish.

It is a further object of the present invention to provide an elastic fishing device that can stretch to a longer length when pulled and return to a shorter normal length when relaxed.

It is a further object of the present invention to provide an elastic fishing device for bank fishing wherein the fishing line can be left unattended to catch fish.

It is a further object of the present invention to provide a fishing device that increases the probability of retaining a fish on the line once it has been hooked.

It is a further object of the present invention to provide a fishing device for supporting a bank fishing line that reduces the probability of breaking the fishing line and/or damaging the hook.

It is a further object of the present invention to provide a fishing device for mounting a fishing leader line that can be quickly set out and taken in when fishing is completed.

It is a further object of the present invention to provide an elastic fishing device that can readily attach and detach from a dock, rail, rope, cable, fence, eye bolt, ramp, tree, pontoon, stanchion or boat.

It is a further object of the present invention to provide a fishing device having shock absorbing capabilities.

It is a further object of the present invention to provide a fishing device having a shock absorbing capability for a fishing leader line.

It is a further object of the present invention to provide a fishing device that increases the probability of setting the hook in a fish's mouth.

It is a further object of the present invention to provide a fishing device that provides storage for sharp fishing hooks.

It is a further object of the present invention to provide a fishing device for resiliently supporting a bank fishing line on an inflexible support.

It is a further object of the present invention to provide a fishing device for bank fishing which includes a storage spool for storing both the cord of the device and the fishing leader line.

It is a further object of the present invention to provide a fishing device which includes a display portion for exhibiting information such as brand name, owner's name, license information and/or registration information.

It is a further object of the present invention to provide a fishing device that can be adjusted to support the fishing leader line in the water at various selected depths.

It is a further object of the present invention to provide an elastic fishing device that can be used to catch fish without the use of a rod and reel.

It is a further object of the present invention to provide a device for catching fish that can be easily stored and transported.

It is a further object of the present invention to provide a fishing device to stretchably secure a fishing leader line to a support.

III. BRIEF DESCRIPTION OF DRAWINGS

Reference is made to the accompanying drawings in which are shown illustrative embodiments of the invention and from which novel features and advantages will be apparent.

IV. DETAILED DESCRIPTION

Figure 1:
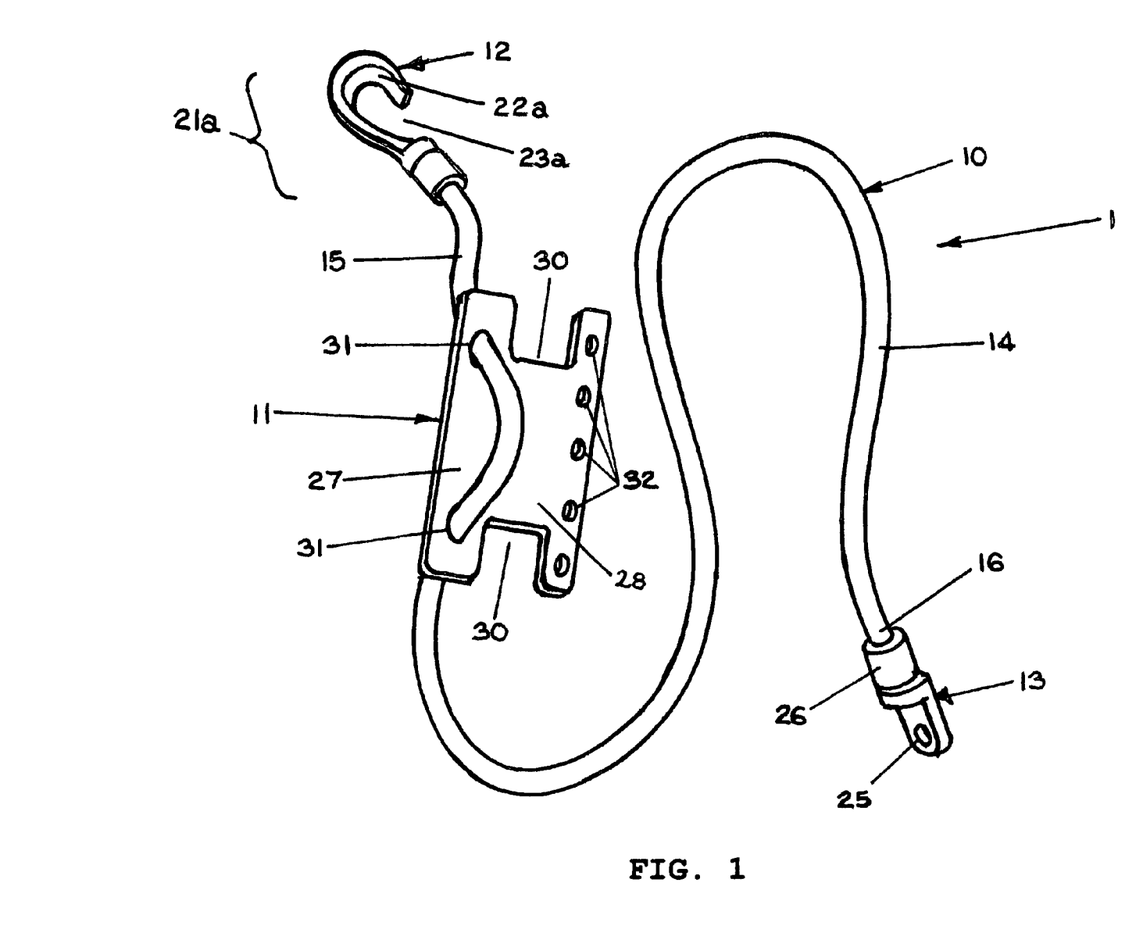
FIG. 1 is a perspective view of a first preferred embodiment of the fishing device of the present invention.

Referring to FIG. 1, the elastic fishing device 1 comprises an elongated elastic member 10, a spool 11, a releasable connector 12, and a line attaching element 13.

The elongated elastic member 10 is a shock cord 14 having first 15 and second 16 ends. The releasable connector 12 in the preferred embodiment of FIG. 1 comprises a hook 21a. The hook 21a has a curved portion 22a and an opening 23a.

The line attaching element 13 is an end fitting that includes an eye 25 and a securing clip 26.

The spool 11 comprises a plate 27 having means for storing the elastic member, means for adjusting the effective length of the elastic member and means for adjustably securing an end of the elastic member.

The means for storing the elastic member includes a winding portion 28 having a pair of notches 30. The notches 30 are disposed on an edge of the plate and are positioned generally opposite to each other on the plate 27.

Figure 7A:
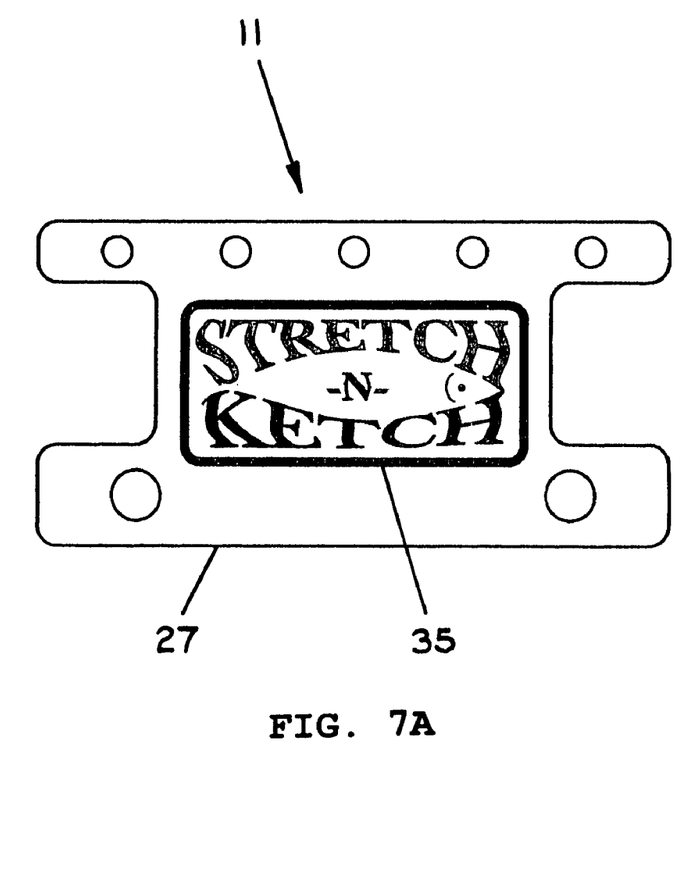
FIGS. 7A and 7B show the respective front and back sides of the spool in FIGS. 1 and 2.
Figure 7B:
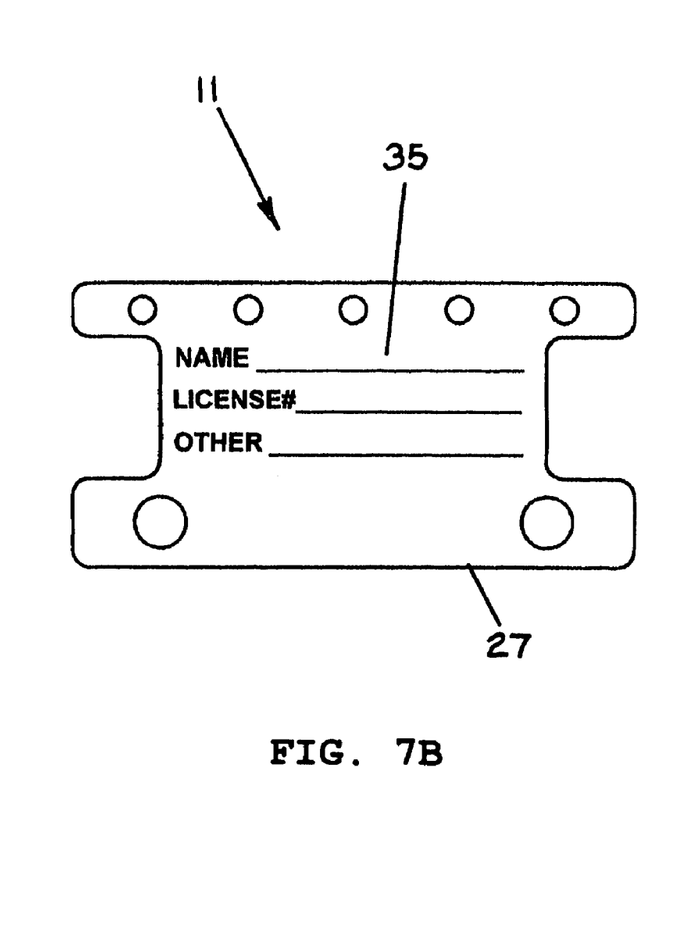

The means for adjusting the effective length of the elastic member comprises a pair of adjusting apertures 31 extending through the plate 27. The means for adjustably securing an end of the elastic member comprises a plurality of through holes 32 disposed in the plate 27. A display portion 35 may be included on one or both sides of the plate 27 as shown in FIGS. 7A and 7B. The display portion 35 can be used to exhibit indicia such as a brand logo, ownership information, registration information or various other printed matter.

Figure 2:
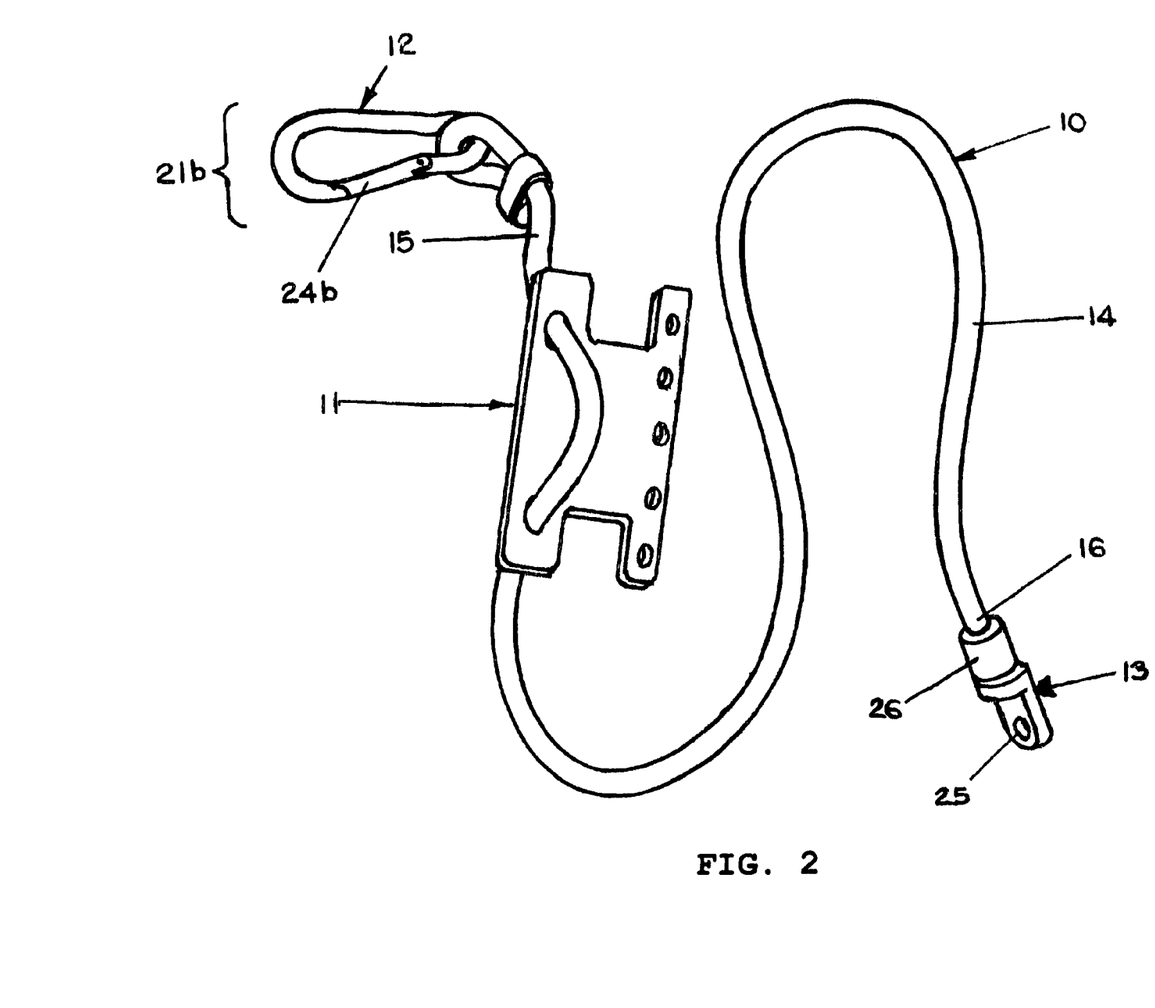
FIG. 2 is a perspective view of a second preferred embodiment of the fishing device of the present invention.
Figure 3A:
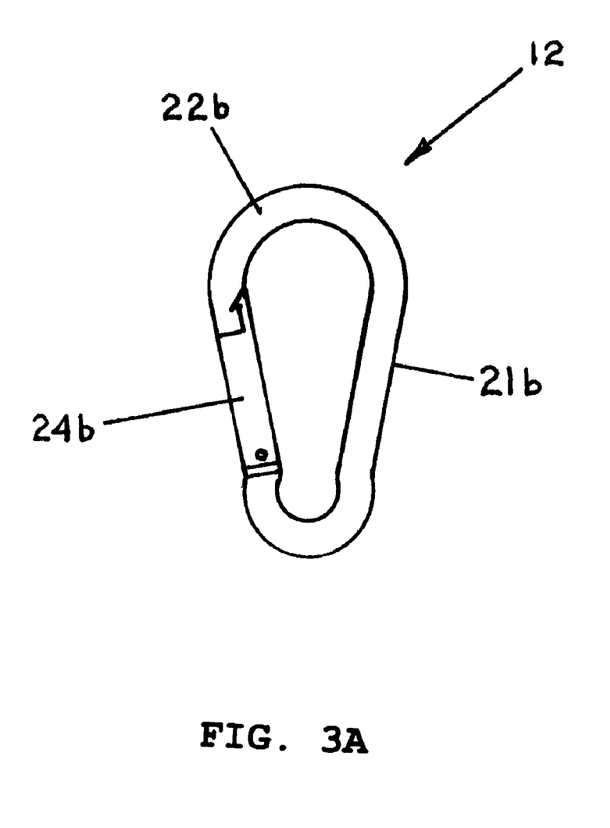
FIG. 3A shows the snap hook of the second preferred embodiment of the elastic fishing device in FIG. 2. The snap hook is in a closed position.
Figure 3B:
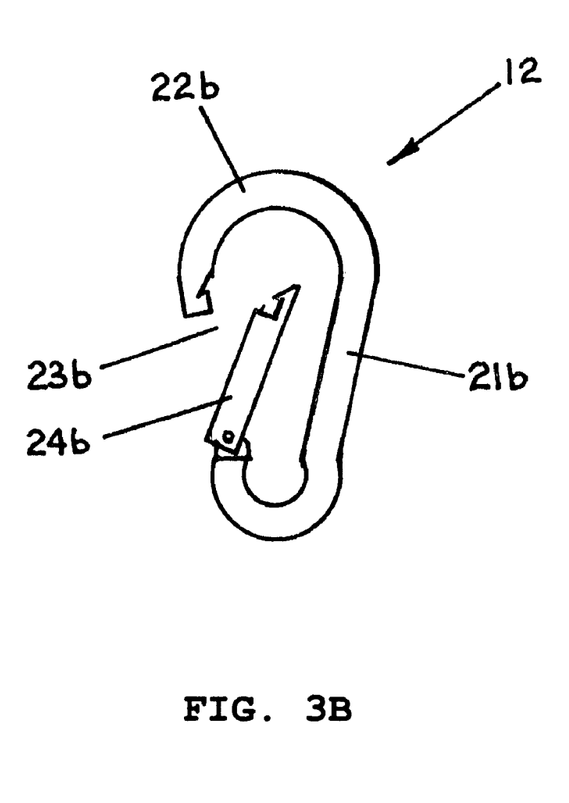
FIG. 3B shows the snap hook of the second preferred embodiment of FIG. 2 in an opened position.

In the second preferred embodiment of FIGS. 2, 3A and 3B, the releasable connector 12 is a snap hook 21b having a curved portion 22b with an opening 23b and a releasable closure 24b.

Referring to FIGS. 1 and 2, the elastic member 10 is elongated with the releasable connector 12 disposed on the first end 15 and the line attaching element 13 or end fitting disposed on the second end 16 thereof. The eye 25 is formed by a closed loop on the line attaching element 13.

The spool 11 is generally planar with a rectangular shape. Although the spool 11 preferably comprises a rectangular shape, it could alternatively be formed in other suitable shapes, including round, square and triangular.

Figure 9:
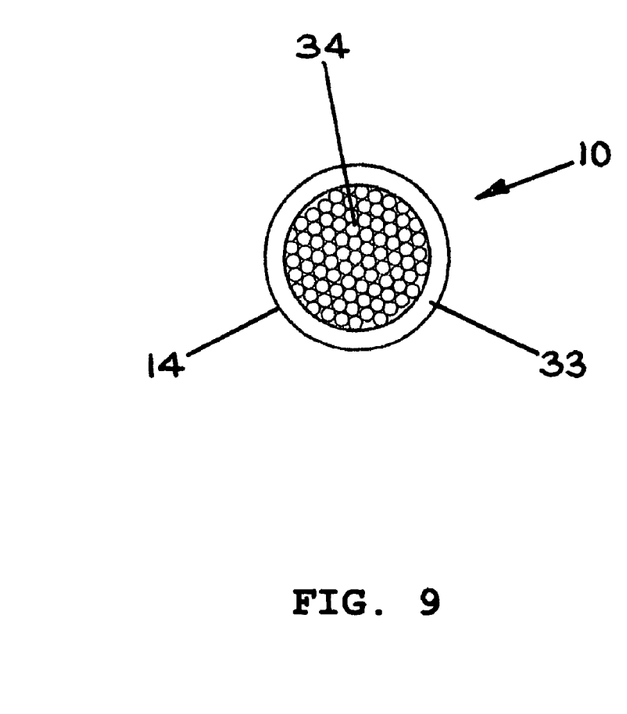
FIG. 9 is a cross sectional view of the shock cord of the fishing device of FIGS. 1 and 2.

In a preferred embodiment, the shock cord 14 of the elastic member 10 is made from a marine grade cord. The cord 14 is comprised of a casing 33 and a core 34 as shown in FIG. 9. The core 34 is formed by a plurality of elastomeric strands. The casing 33 is made of woven nylon having the capability to stretch and retract along the length of the casing 33. Other suitable pliable materials, including polyester or natural fibers may be substituted for the nylon of the casing 33 of the preferred embodiment, while other suitable elastic materials may be substituted for making the core.

Furthermore, the elastic member 10 may be formed alternatively of a strip of rubber or other suitable elastic material. It is preferable that the elastic member 10 has sufficient elasticity to generally respond to a fish or to play a fish in a way that somewhat simulates the reaction of a fishing rod to a fish.

In the preferred embodiments of FIGS. 1 and 2, the releasable connector 12 is preferably comprised of metal, plastic or composite and the spool 11 is made of plastic. In addition, the plastic comprising the spool 11 may have illuminative characteristics so that the spool 11 would glow in the dark to enhance night visibility.

The hook 21a, 21b is preferably comprised of aluminum, but other suitable materials could be used instead, including plastics, stainless steel, copper, or other metals.

The elastic member 10 is adapted to wrap around the support to which the fishing device 1 is to be attached. Additionally, the elastic member 10 is stretchable and therefore allows the fishing leader line and hook to extend when pulled, then retract when released. A fishing leader line is attached to the fishing device 1 by the line attaching element 13 on the elastic member 10. The fishing leader line can be attached to the eye 25 by various methods, including tying or clipping.

The releasable connector 12 provides means for securing the fishing device 1 to a support. Preferably, the connector 12 is hooked onto the elastic member 10 to secure the fishing device 1 in place on the selected support. Alternatively, the releasable connector 12 can be attached directly to the support. In such case, the hook 21a, 21b of the releasable connector 12 can be hooked onto a line, such as a cable or rope.

Figure 4:
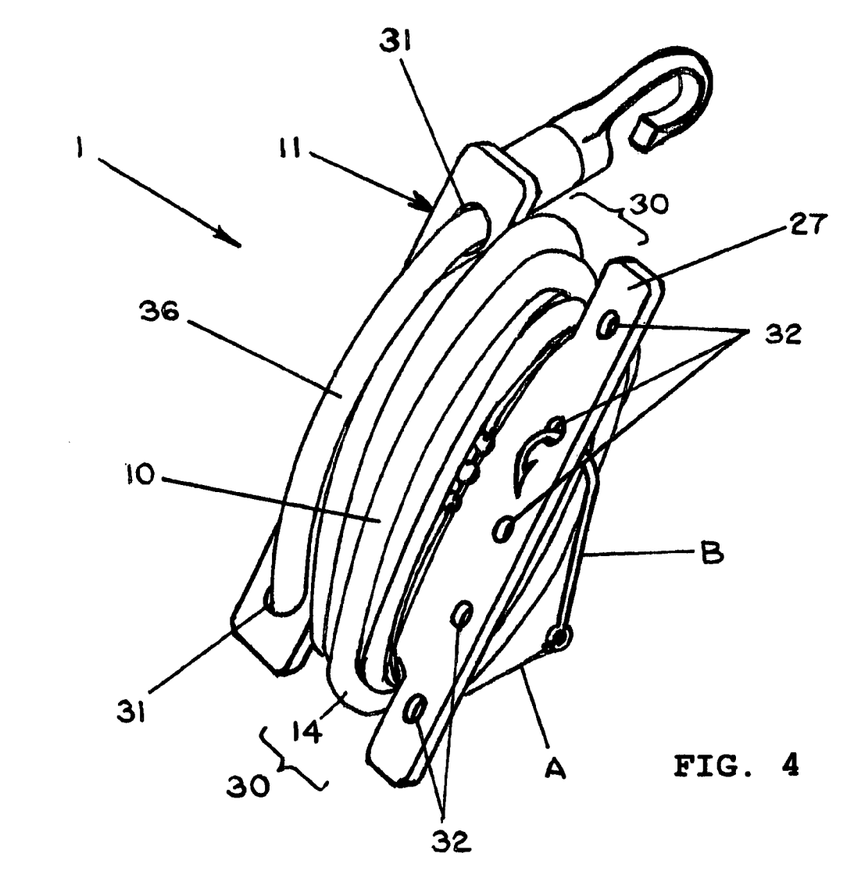
FIG. 4 shows the elastic fishing device of FIG. 1 and a fishing leader line in the stored configuration.

The notches 30 on the plate 27 of the spool 11 receive the elastic member 10 when it is wrapped around the spool 11 for storing as shown in FIG. 4. When the leader line A is stored with the fishing device 1, the leader line A is also wrapped around the plate 27, such that both the elastic member 10 and the leader line A are held within the notches 30. The hook B is inserted through the appropriate through hole 32 to secure the elastic member 10 and leader line A in a stored configuration on the plate 27. The plurality of through holes 32 for receiving the fishing hook B, provides adjustability for storing different lengths of cord 14 and leader line A.

Figure 8A:
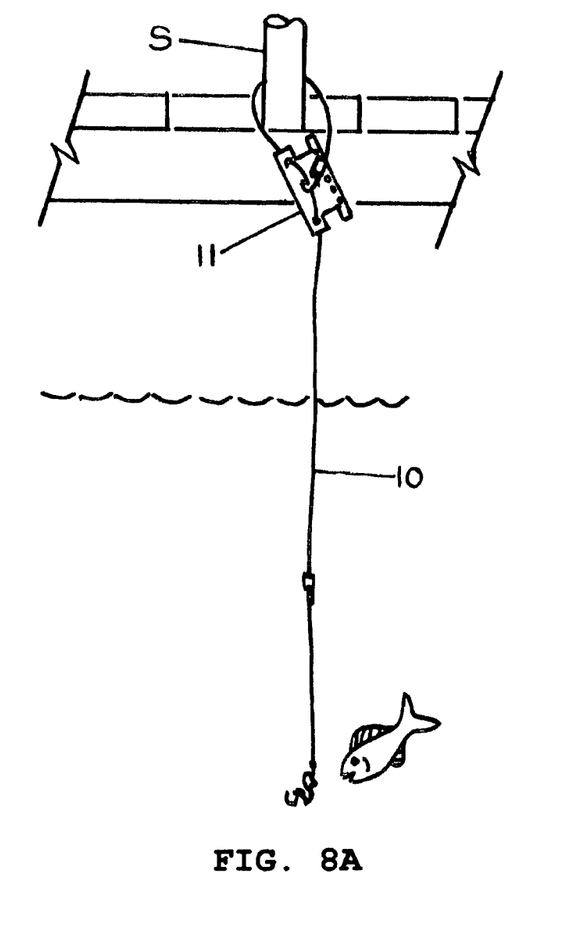
FIGS. 8A and 8B show the fishing device of FIG. 1 set out on a dock wherein in each respective figure, the fishing device is adjusted to fish at a different depth in the water.
Figure 8B:
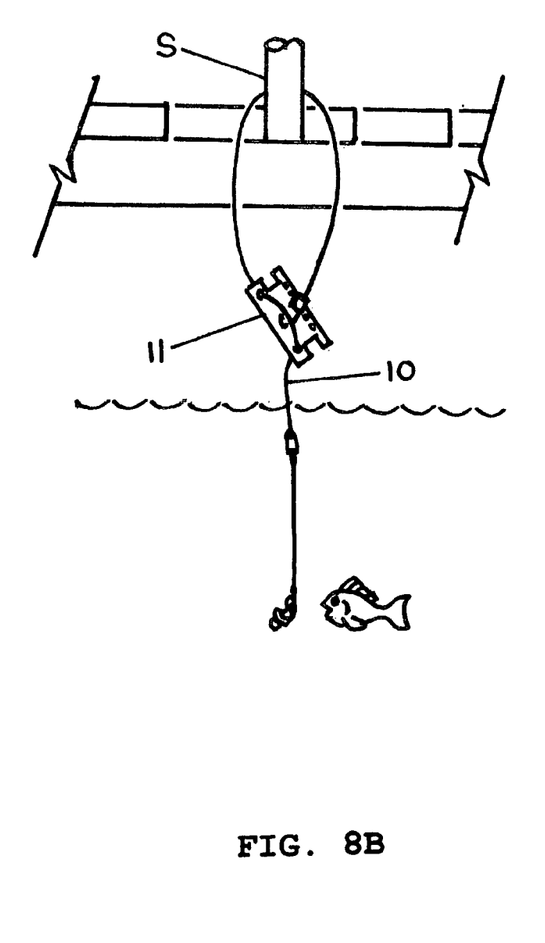

The adjusting apertures 31 receive the elastic member 10 therein and hold the elastic member 10 onto the plate 27. The effective length of the elastic member 10 can be adjusted by moving the plate 27 up and down the length of the shock cord 14. By sliding the cord 14 through the adjusting apertures 31 on the spool 11, the effective length of the elastic member 10 can be changed, as indicated in FIGS. 8A and 8B. In FIG. 8A the elastic member 10 comprises a longer effective length than in FIG. 8B. Adjusting the effective length of the elastic member 10 can ultimately determine the depth at which the hook is set for fishing.

In addition, the spool 11 can be moved along the length of the elastic member 10 to adjust for the size of the support to which the fishing device 1 is to be attached.

Figure 5:
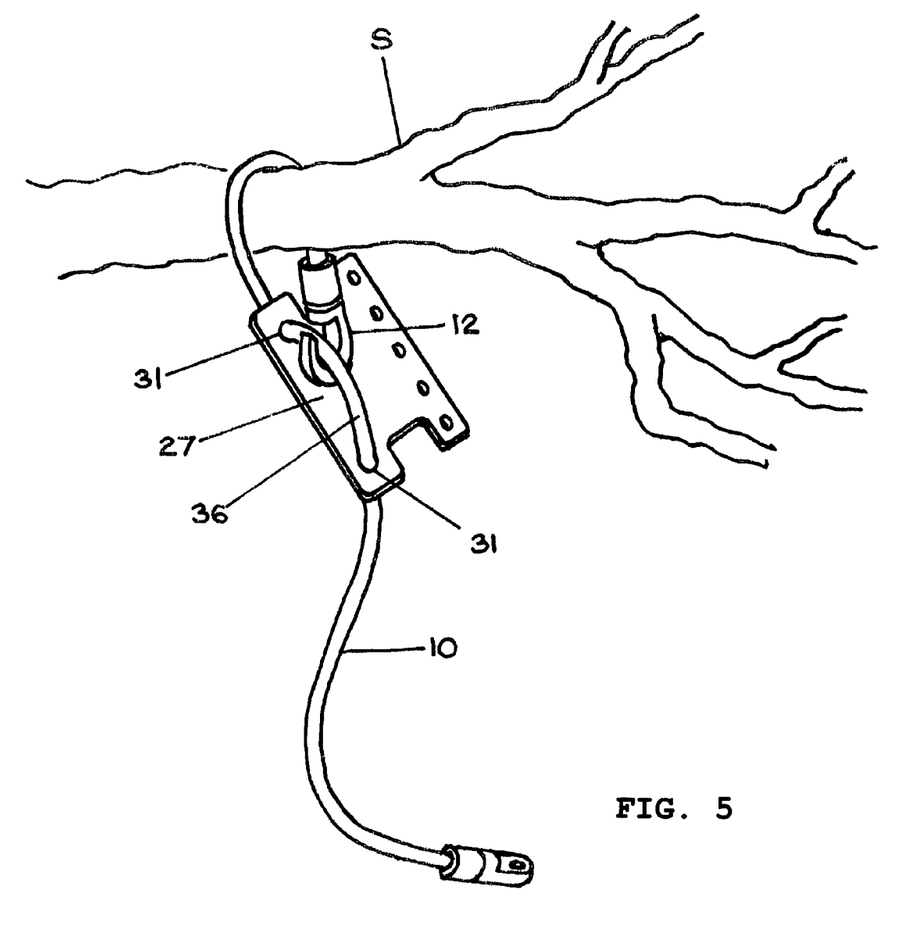
FIG. 5 shows the elastic fishing device of the present invention of FIG. 1 attached to a tree branch for use.
Figure 6:
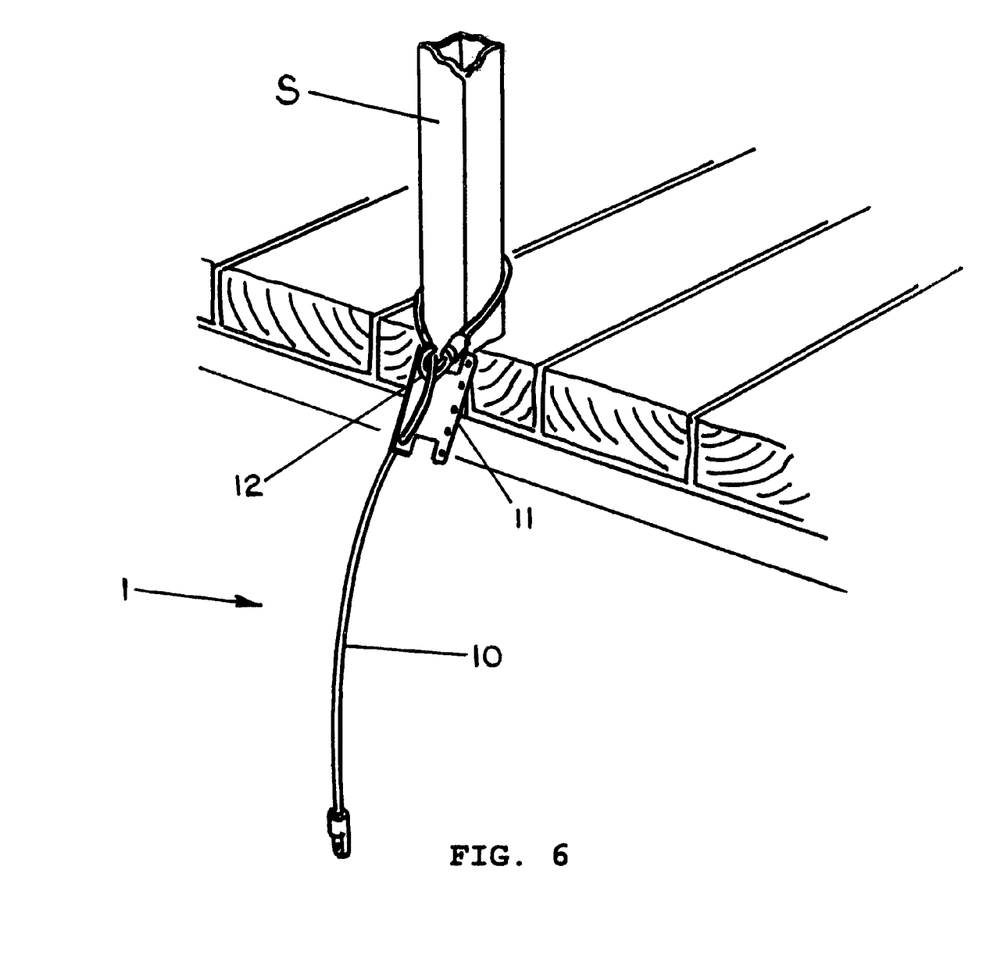
FIG. 6 shows the fishing device of the present invention of FIG. 1 attached to an upright post.

Referring to FIG. 5, the elastic member 10 extends through the adjusting apertures 31 and forms a loop 36 across a surface of the plate 27. The portion of the elastic member 10 forming the loop 36 serves as means for receiving the releasable connector 12. As shown, the releasable connector 12 is secured to the loop 36 to removably hold the shock cord 14 around the support.

Referring back to FIG. 1, the releasable connector 12 and the line attaching element 13 are attached to the respective first 15 and second 16 ends of the elastic member 10. The releasable connector 12 is on the first end 15 of the elastic member 10 and the line attaching element 13 is on the second end 16.

In the second preferred embodiment of FIG. 2, the releasable closure 24b on the snap hook 21b pivots between a closed position as shown in FIG. 3A and an opened position as shown in FIG. 3B.

In the opened position (FIG. 3B), the opening 23b on the snap hook 21b is at least partially unobstructed. In the closed position (FIG. 3A), the releasable closure 24b substantially covers the opening 23b to secure the elastic member 10 or support directly within the snap hook 21b. The releasable closure 24b is spring biased towards the closed position. By pressing against the biasing force of the releasable closure 24b, the snap hook 21b can be opened.

The fishing device 1 further includes a stored configuration and an in-use configuration. In the stored configuration as shown in FIG. 4, the elastic member 10 is wrapped around the spool 11. It is preferred that the device 1 is stored with the fishing leader line A and hook B such that both the elastic member 10 and leader line are wrapped around the spool 11. In this stored configuration, the fish hook B on the leader line A can be inserted into one of the through holes 32 on the spool 11. By inserting the hook B into a selected through hole 32, the leader line A and elastic member 10 can be held in the stored configuration on the spool 11. The different through holes 32 along a length of the plate 27 can be alternately selected to receive the hook B in order to adjust the tightness of the shock cord 14 and leader line A wrapped on the spool 11.

In the in-use configuration of FIGS. 1 and 2, the elastic member 10 is unwound from around the spool 11. To unwind the elastic member 10 with an attached leader line A and hook B from a stored configuration, the fish hook B is removed from the through hole 32. The leader line A and the elastic member 10 are then removed from the notches 30 of the winding portion 28 by unwinding them from around the spool 11.

In a preferred use, the fishing device 1 is released from a stored configuration to the in-use configuration. The elastic member 10, in combination with a fishing leader line A and hook B, is attached to a selected support S shown in FIGS. 5, 6, 8A and 8B. The hook B is baited and lowered into the water at the selected fishing spot.

When fishing is completed, the fishing device 1 can be returned to the stored configuration. The elastic member 10, and leader line A are wound around the spool 11 and the hook B is inserted into a selected through hole 32.

Initially, the leader line A is attached to the eye 25 by one of a variety of methods. The variety of methods can include tying the line directly onto the eye 25 and providing a separate connector on the leader line A for attachment to the eye 25.

In the in-use configuration, the elastic fishing device 1 is ready for attachment to a support. In one preferred method of attachment, the elastic member 10 is wrapped around the support and the releasable connector 12 is hooked onto the loop 36 formed by the elastic member 10 on the plate 27. This secures the elastic member 10 in place around the support.

Alternatively, the snap hook 21b of the second preferred embodiment can be hooked directly onto a suitably sized support such as a line, rope or cable. The releasable closure 24b is opened, and the line, rope or cable is inserted through the opening 23b and into the snap hook 21b, and the releasable closure 24b is released to substantially cover the opening 23b.

The effective length of the elongated elastic member 10 can be adjusted to determine the preferred fishing depth either before or after installing the device 1 on a support. By moving the spool 11 up and down the elastic member 10 the effective length is adjusted.

With the fishing device 1 of the present invention, a fisherman can quickly and easily set out and take in his or her fishing lines. The elastic member 10 of the fishing device inhibits breakage of the leader line and therefore increases the probability of catching more fish. In addition, the elastic member 10 simulates the action of a fishing rod and therefore eliminates the need for a rod and reel. The fishing device can be easily transported in its stored configuration and further provides storage for the leader line and hook.

Although the present invention has been described in considerable detail with reference to certain preferred versions thereof, other versions are possible. Therefore, the spirit and scope of the appended claims should not be limited to the description of the preferred versions contained herein.

The invention claimed is:

1. An elastic fishing device comprising:
an elongated elastic member;
a spool disposed on said elongated elastic member;
a releasable connector for attaching the device to a support;
a line attaching element;

a fishing leader line secured by said line attaching element to said elongated elastic member; said fishing leader line having a hook;
an in-use configuration; and
a stored configuration;
said elongated elastic member comprising a shock cord having first and second ends;
wherein said releasable connector is attached to said first end of said elongated elastic member and said line attaching element is attached to said second end;
said releasable connector comprising a hook;
said spool comprising a plate having a winding portion, a plurality of adjusting apertures and a plurality of through holes;
said winding portion includes a pair of notches;
wherein said notches are disposed on an edge of said plate and are disposed generally opposite each other, and said elongated elastic member extends through and is held in said plurality of adjusting apertures;
wherein in said stored configuration, said elongated elastic member is wound around said spool with said shock cord disposed in said notches of said winding portion, and said second end of said elongated elastic member is releasably and selectively secured to one of said through holes by said hook; and in said in-use configuration, said elongated elastic member is unwound from said spool.

2. The elastic fishing device of claim 1, wherein said plate further comprising a display portion.

* * * * *